Jan. 8, 1946. L. R. PRICE 2,392,615
LETTERING GUIDE
Filed June 6, 1944 2 Sheets-Sheet 1
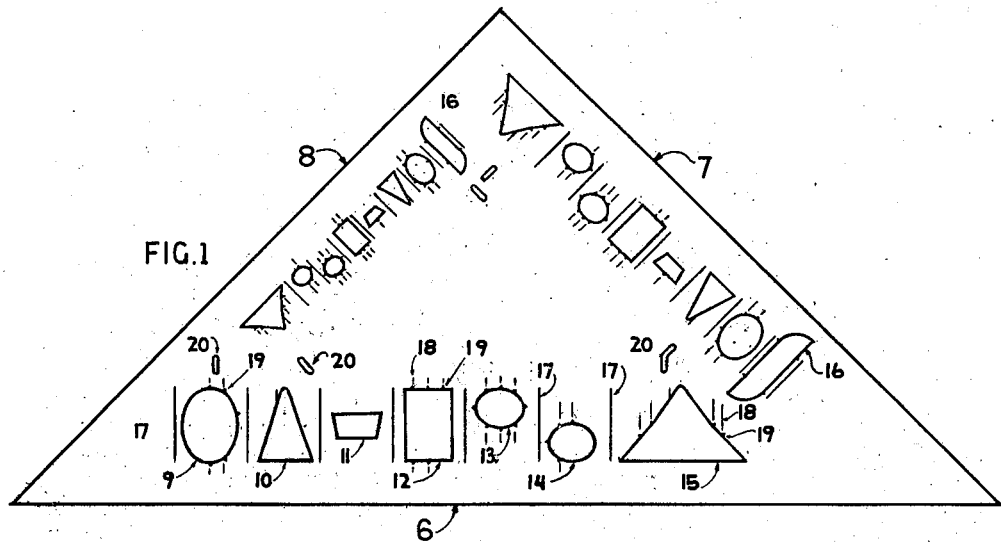

Jan. 8, 1946.  L. R. PRICE  2,392,615
LETTERING GUIDE
Filed June 6, 1944  2 Sheets-Sheet 2

FIG. 6

Patented Jan. 8, 1946

2,392,615

UNITED STATES PATENT OFFICE 2,392,615

LETTERING GUIDE

Llewellyn R. Price, Fort Washington, Pa.

Application June 6, 1944, Serial No. 538,943

7 Claims. (Cl. 33—174)

My invention relates to a lettering guide device and has for its primary object the provision of a lettering guide to assist the draftsman in lettering and dimensioning drawings and similar work whenever hand-drawn letters and numbers may be required.

It is a further object of my invention to provide a lettering guide which is extremely simple to operate and will produce lettering and numbers of uniformity and legibility. My improved lettering guide can be used with little or no instruction. Its cost is low and the instrument is not cumbersome nor hard to handle. The guide can be used with a pencil or pen or any similar marking tool and, if desired, can be embodied in the usual transparent draftsman's triangle as shown in the drawings.

It is another object of my invention to provide a guide having complementary pencil guiding apertures which are so shaped and arranged with respect to each other that all capital letters and numbers can be made by using only seven apertures and lower case letters require but one additional aperture. By means of my novel spacing and arrangement of the apertures any letter or number can be formed quickly and accurately with a minimum of movement of the guide, and I have found that in a short time even a novice draftsman can learn to use the guide to letter quickly, uniformly and legibly.

I have illustrated the guide in the accompanying drawings wherein—

Fig. 1 illustrates my improved guide in the form of a triangle with three sets of apertures to form vertical letters and numbers of different size.

Fig. 2 illustrates a triangle having sets of apertures designed to produce pitched or slanting lettering, the pitch being at an angle of approximately 67 degrees.

Fig. 3 illustrates a sample of vertical upper and lower case letters and vertical numbers made by use of the guide.

Fig. 4 is similar to Fig. 3, the letters and numbers having been made with a smaller set of apertures.

Fig. 5 shows upper and lower case letters and numbers made with the pitched guide shown in Fig. 2.

Fig. 6 is a chart showing how the apertures are used in production of the various letters of the alphabet and numbers for both capitals and lower case letters.

Referring now to the drawings. In Fig. 1 I have shown a transparent triangle having a base 6 and sides 7 and 8, and along the base and each side a series of apertures for use in guiding the draftsman in the production of vertical letters and numbers. The series of apertures along the base 6 consists of eight openings numbered from left to right from 9 to 15 inclusive.

The base 6 of the triangle serves as a guide base. This guide base does not necessarily have to be a straight edge as illustrated, although I believe this to be preferable. It is sufficient that the guide base has two spaced points which can be held against a T square or other straight edge device and I use the term "guide base" to indicate any base which will provide a straight line parallel to which the apertures may be located. In the triangles illustrated in Figs. 1 and 2 the apertures are spaced approximately ⅜ inch from the guide base with the bottom or base of most of the apertures resting on or in a base line parallel to and ⅜ inch from the guide base. All apertures are measured in radii units, and the base line may be said to be at 0 units. The apertures, except as otherwise noted, are measured in height from this line up and this is true regardless of the actual size of the aperture.

The series of eight apertures which are located parallel to base 6 of the triangle of Fig. 1 are as follows:

9 is a generally elliptical aperture 3 radii units high and 2.27 radii units wide.

10 is a narrow isosceles triangle, 3 radii units high and with a base 2.27 radii units wide.

11 is a horizontal trapezoid, the bottom of which is 1 radius unit above the base line, ¾ unit high and approximately 2¼ units long. This aperture may be in the form of a parallelogram or rectangle so long as the upper and lower edges are parallel to the base line, or, if desired, may be simply a slot parallel to the base line.

12 is a rectangle, 3 radii units high and 2.27 units wide.

13 is a generally elliptical aperture, 2.27 radii units wide and 1½ units high, located with the uppermost part of the curve 3 units above the base line.

14 is an elliptical aperture identical with 13, except that it is located with the lowest part of the curve on the base line.

15 is a wide isosceles triangle, the sides having a slight convexity, 3 radii units high, and approximately 4.6 units wide at the base.

For the purposes of the claims I have referred to the base line and an upper line. This upper line is a line parallel to the guide base and base line and is located 3 radii units above the base line. The upper part of several of the figures will touch or lie on this upper line.

The series of apertures along the sides 7 and 8 of the triangle of Fig. 1 include one aperture not included in the series located along the base 6 of the triangle. This is the aperture I have indicated by the reference numeral 16 located at the extreme left of the others. This aperture extends 4.50 radii units above the base line and 1.50 units below. It is 1.50 units wide and has an arcuate edge at the top and bottom located above and below the upper and base lines, respectively. The series of apertures along the sides 7 and 8 of the triangle in Fig. 1 are otherwise the same in shape as those illustrated in the series shown lying along the base.

Generally to the left of each aperture a line normal to the base line 6 will be marked on the triangle. I have indicated these lines by the reference numeral 17. They are spacer lines by which the position of each succeeding letter in relation to the preceding letter may be gauged. I have also indicated on the triangle stop lines 18 parallel to the spacer line 17 lying along the edge of the apertures. These stop lines indicate the limit to which the pencil should be moved in forming certain of the letters or portions of the letters, and, if desired, very minute notches 19 which will guide the draftsman in stopping his pencil at a certain point may be made at a point where these lines intersect the edges of the apertures. I have found that these notches may be made small enough so that they will not impair the formation of letters if the draftsman desired to pass them with his pencil but can be made sufficiently large so that a slight "click" will be felt if the draftsman desires to stop at a particular notch.

In Fig. 3 I have drawn some sample upper case letters, some sample lower case letters, and some sample numbers which were made with a triangle having apertures of approximately the same size and arrangement of those along the base 6 of the triangle of Fig. 1.

Fig. 4 illustrates sample letters and numbers made with one of the smaller series of numbers alongside.

It will be noted that there are several small slots 20 in the triangle and these have been provided to permit the insertion of a strip of heavy paper parallel to the base line of each set of apertures or other suitable device to lift the triangle above the surface of the paper on which the draftsman may be working in case it is desired to use the triangle as a guide for inking. Small screws or other device to lift the triangle from the paper could be used if desired.

In Fig. 2 I have illustrated a lettering guide in which the figures and letters produced will have a pitch or slant of about 67°. The shape of the apertures shown in this triangle is substantially the same as the apertures of the triangle of Fig. 1, excepting for the pitch or slant which is given to them. This, of course, means that the rectangle becomes a parallelogram and the isosceles triangles no longer isosceles. The spacer lines and stop lines are also slanted but it is believed that the apertures need not be described again if it is borne in mind that they are the same as those of the triangle of Fig. 1 with the 67° pitch. In the claims I refer to these lines as being substantially vertical whether pitched or perfectly vertical.

In Fig. 5 I have illustrated lettering made by use of the triangle such as that illustrated in Fig. 2.

It should also be understood that it is not necessary that the apertures which have been stated to be elliptical be of the exact configuration noted. They may, for example, be circular, and in the claims when I use the term "ellipse" I intended to cover slight variations including the circular. I have found, however, that a more pleasing appearance results if the apertures are elliptical.

In Fig. 6 I have illustrated how 26 capital letters, 26 lower case letters, and numbers 0 to 9 may be made with each set of apertures. It will be seen from the chart in Fig. 6 that the larger, vertical elliptical apertures, the narrow isosceles triangle, and the vertical rectangle each produces certain complete letters. Grouping the narrow triangle, the horizontal smaller trapezoid, and the vertical rectangle, enables the draftsman rapidly to produce such letters as A, E, F, H, and such numbers as 4 and 7. Ten letters and two digits are produced by these three openings. Six more are produced with the elliptical aperture. Two smaller elliptical apertures are placed next to the vertical rectangle so that the letters B, P, R (partially) and the number 5 may be readily drawn. The wide triangle is placed at the end because of the fact that it is least used.

From the foregoing it will be seen that an important advantage of my design is that it consists of but few units closely grouped together, the apertures which are used to complement other apertures in the formation of letters being closely grouped together. For instance, the two small elliptical apertures are placed next to the rectangle so that a vertical line may be drawn with one edge of the rectangle and the accurate proportions of such letters as B and E formed by means of the complementary elliptical apertures which are next in the series.

It has been my observation that the apprentice or junior draftsman and many others of some years experience can produce acceptable work only with a guide such as a triangle T-square or French curve. For this draftsman lettering has been a perplexing problem. With my lettering device, all draftsmen will be able to turn out with very little practice entirely satisfactory lettering which would be legible, uniform, and pleasing in appearance.

As has been pointed out, the guide can be used with ink as well as pencil. The ordinary pen, of course, cannot be used but there are several lettering pens on the market which can be used quite readily with my improved letter guide.

I claim:

1. A lettering device comprising a flat transparent member having a guide base at one edge thereof, a series of complementary pencil guiding apertures comprising apertures in the form of an ellipse, a triangle and a parallelogram the base of the triangle and parallelogram and the bottom of the ellipse lying in a base line parallel to the guide base, the top portion of said apertures lying in an upper line parallel to the guide base, two apertures in the form of smaller ellipses, the bottom of one lying on said base line and the top of the other lying in said upper line and an aperture in the form of a trapezoid lying substantially centrally between said upper and lower lines and having its parallel edges parallel to said guide base.

2. A lettering device comprising a flat transparent member having a guide base at one edge thereof, a series of complementary guiding apertures located in the series in the order stated, comprising an aperture in the form of an ellipse the bottom thereof lying on a base line parallel to said guide base and the upper part on an upper line parallel to said guide base, a triangle having its base on said base line and its apex on said upper line, an aperture having one edge lying between said base and upper lines and parallel to said guide base, a parallelogram the bottom and top edges of which lie on said base and upper lines respectively, and two apertures in the form of smaller ellipses, the top of one lying on said upper line and the bottom of the other lying on said base line.

3. A lettering device comprising a flat transparent member having a guide base at one edge thereof, a series of complementary pencil guiding apertures comprising apertures in the form of an ellipse, a triangle and a parallelogram the base of the triangle and parallelogram and the bottom of the ellipse lying in a base line parallel to the guide base, the top portion of said apertures lying in an upper line parallel to the guide base, two apertures in the form of smaller ellipses, the bottom of one lying on said bottom line and the top of the other lying on said upper line, an aperture having one edge lying between said upper and base lines and substantially parallel to said guide base, and an aperture with substantially parallel upright edges and arcuate ends.

4. A lettering device comprising a flat transparent member having a guide base at one edge thereof, a series of complementary pencil guiding apertures comprising apertures in the form of an ellipse, a triangle and a parallelogram the base of the triangle and parallelogram and the bottom of the ellipse lying in a base line parallel to the guide base, the top portion of said apertures lying in an upper line parallel to the guide base, two apertures in the form of smaller ellipses, the bottom of one lying on said bottom line and the top of the other lying on said upper line, an aperture having one edge lying between said upper and base lines and substantially parallel to said guide base, and an aperture with substantially parallel vertical edges and arcuate end portions, said aperture extending above and below said upper and lower lines respectively.

5. A lettering device comprising a flat transparent member having a guide base at one edge thereof, a series of complementary pencil guiding apertures comprising apertures in the form of an ellipse, a triangle and a parallelogram the base of the triangle and parallelogram and the bottom of the ellipse lying in a base line parallel to the guide base, the top portion of said apertures lying in an upper line parallel to the guide base, two apertures in the form of smaller ellipses, the bottom of one lying on said bottom line and the top of the other lying on said upper line, an aperture having one edge lying between said upper and base lines and substantially parallel to said guide base, said device having substantially vertical guide lines marked thereon between apertures to guide in the spacing of the letters to be formed.

6. A lettering device comprising a flat transparent member having a guide base at one edge thereof, a series of complementary pencil guiding apertures comprising apertures in the form of an ellipse, a triangle and a parallelogram the base of the triangle and parallelogram and the bottom of the ellipse lying in a base line parallel to the guide base, the top portion of said apertures lying in an upper line parallel to the guide base, two apertures in the form of smaller ellipses, the bottom of one lying on said bottom line and the top of the other lying on said upper line, an aperture having one edge lying between said upper and base lines and substantially parallel to said guide base, said device having substantially vertical guide lines intersecting the edges of the apertures, said guide lines indicating pencil stopping positions for the formation of certain of the letters.

7. A lettering device comprising a flat transparent member having a guide base at one edge thereof, a series of complementary pencil guiding apertures comprising apertures in the form of an ellipse, a triangle and a parallelogram the base of the triangle and parallelogram and the bottom of the ellipse lying in a base line parallel to the guide base, the top portion of said apertures lying in an upper line parallel to the guide base, two apertures in the form of smaller ellipses, the bottom one lying on said bottom line and the top of the other lying on said upper line, an aperture having one edge lying between said upper and base lines and substantially parallel to said guide base, said device having slight notches in the edges of the apertures to indicate pencil stopping positions for the formation of certain of the letters.

LLEWELLYN R. PRICE.